Patented Nov. 21, 1944

2,363,466

UNITED STATES PATENT OFFICE 2,363,466

AMINOALKANEDIOLS

Murray Senkus, Terre Haute, Ind., assignor to Commercial Solvents Corporation, Terre Haute, Ind., a corporation of Maryland No Drawing. Application May 7, 1942,
Serial No. 442,081

7 Claims. (Cl. 260—584)

My invention relates to new and useful aminoalkanediols. More particularly, it is concerned with N-disubstituted amino polyhydric alcohols having the following general structural formula:

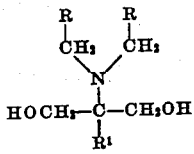

wherein R represents a member selected from the group consisting of hydrogen and alkyl, and $R^1$ represents a member selected from the group consisting of hydrogen, alkyl, and alpha-hydroxyalkyl. As examples of the aminoalkanediols which may be included within the scope of my invention, are the 2-dialkylamino-1,3-propanediols, specifically 2-dibutylamino-1,3-propanediols, and 2-dimethylamino-1,3-propanediols, which have the following structural formulas:

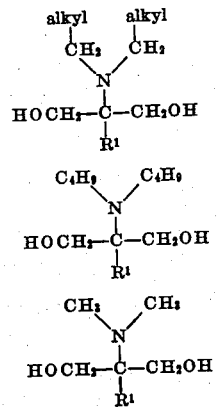

wherein $R^1$ may represent hydrogen, alkyl, or alpha-hydroxyalkyl.

The aminoalkanediols of my invention are preferably prepared by the catalytic hydrogenation of the corresponding 1-aza-3,7-dioxabicyclo(3.3.0)octanes. According to this process, the corresponding 1-aza-3,7-dioxabicyclo(3.3.0)octane is subjected to hydrogenation at normal or elevated pressures, in the presence of a hydrogenation catalyst in the liquid phase, with or without an organic solvent, at a temperature below 150° C. In general, any hydrogenation catalyst is desirable which possesses catalytic activity under the conditions employed. I desire, however, to employ a finely-divided Raney nickel catalyst, as this catalyst is very active, under the conditions employed in a hydrogenation process of this type, and has an exceptionally long life.

The hydrogenation reaction in general may be effected at temperatures ranging from 20° C.– 150° C. I have found it preferable, however, to carry out such reaction at a temperature of 70–80° C., and at a hydrogen pressure of about 2000 pounds per square inch. The rate of reaction is directly proportional to temperatures and pressures utilized, and therefore if a lower pressure is desired, a correspondingly higher temperature should be employed. Lower pressures and temperatures will ordinarily require a longer reaction time, while, conversely, higher pressures and temperatures will in general shorten the time of the reaction. However, under the latter conditions, excessive pressures and/or temperatures, even with a short reaction period, tend to result in lower yields of the desired aminoalkanediols. In carrying out the reaction in accordance with the preferred conditions described above, the hydrogenation is in general found to be complete after a period of from 2 to 4 hours, although some of the higher molecular weight compounds require considerably longer periods for the completion of the hydrogenation. Optimum conditions in regard to the temperature, pressure, and catalyst, in any given instance, however, may be readily determined by simple experiment. Also, it is generally desirable to employ a suitable solvent, such as methanol or ethanol.

When hydrogen is no longer absorbed in the reaction, the catalyst is separated from the reaction mixture by filtration, and the solvent, if employed is distilled off. The aminoalkanediols, obtained in this manner, are, in general, relatively pure products. However, if it is desired to purify these materials further, if solids at ordinary temperatures, they may be recrystallized readily from the common organic solvents such as methanol, benzene, ether, and the like. The products which are liquids at ordinary temperatures, may be purified further by distillation at reduced pressures.

The 1-aza-3,7-dioxabicyclo(3.3.0)octanes employed in the preparation of these aminoalkanediols may be produced in accordance with any suitable procedure. However, I prefer to prepare such compounds in accordance with the process described in my copending application Serial No. 441,021, filed April 29, 1942. According to this process, approximately one molecular equivalent of an aminopolyhydroxy compound and two molecular equivalents of the desired aldehyde are heated slowly at atmospheric pressure and then at reduced pressure until two moles of water, per mole of aminopolyhydroxy compound employed, has been liberated. As examples of such compounds, there may be mentioned 5-hydroxymethyl-1-aza-3,7-dioxabicyclo(3.3.0)octane, 5-methyl-1-aza-3,7-dioxabicyclo(3.3.0)octane, 5-ethyl-1-aza-3,7-dioxabicyclo(3.3.0)octane, 2,8-dipropyl-5-methyl-1-aza-3,7-dioxabicyclo(3.3.0)octane, 2,8-dipropyl-5-ethyl-1-aza-3,7-dioxabicyclo(3.3.0)-octane, and the like.

My invention may be further illustrated by the following specific examples:

Example I

Ninety-two parts of 5-hydroxymethyl-1-aza-3,7-dioxabicyclo(3.3.0)octane were dissolved in 400 parts of methanol. This mixture was then placed in a suitable hydrogenation apparatus with 10 parts of Raney nickel catalyst. This solution was then hydrogenated at 2000 pounds pressure, and 75° C. for a period of 4 hours, with constant agitation. The reaction mixture was filtered to remove the catalyst, and heated until 350 parts of methanol had distilled. The product of the residue was then cooled and the crude 2-dimethylamino-2-hydroxy-methyl-1,3 - propanediol crystallized. The crude product was further purified by recrystallization from methanol. The product amounted to 80 parts, corresponding to a yield of 85 per cent.

Analysis: calculated for $C_6H_{15}NO_3$: N, 9.40; neutral equivalent, 149. Found: N, 9.55; neutral equivalent, 149.

Example II

One hundred and twenty-eight parts of 2,8-dipropyl-5-ethyl-1-aza-3,7 - dioxabicyclo(3.3.0)octane, 400 parts of methanol, and 10 parts of Raney nickel catalyst, were placed in a suitable hydrogenation apparatus, and sealed. The mixture was then hydrogenated at 2200 pounds pressure and 100° C. for four hours. The catalyst was then separated by filtration, and the filtrate rectified at reduced pressure. The 2-dibutyl-amino-2-ethyl-1,3-propanediol was collected at 123° C., and 1 mm. pressure.

Analysis calculated for $C_{12}H_{27}NO_2$: N, 6.95; found: N, 6.97.

Example III 2-dimethylamino-2-ethyl-1,3-propanediol was prepared by hydrogenating a mixture consisting of 250 parts of 5-ethyl-1-aza-3,7-dioxabicyclo(3.3.0)octane, 400 parts of methanol, and 10 parts of Raney nickel catalyst, for approximately four hours at 2000 pounds per square inch pressure, and 75° C. The product distilling at 110–111° C., at 2 mm. pressure, amounted to 240 parts, corresponding to a yield of 93 per cent. When subjected to a cooling effect, the 2-dimethylamino-2-ethyl-1,3-propanediol solidified to a crystalline substance, melting at 32° C. (uncorrected).

Analysis calculated for $C_7H_{17}NO_2$: N, 9.52; neutral equivalent, 147. Found, N, 9.45; neutral equivalent 147.

The aminoalkanediols of the present invention are either white crystalline solids or colorless high boiling liquids. Their solubility in different solvents depends on the size of the alkyl groups attached to the nitrogen atom. In general, the lower molecular weight group compounds are soluble in water and methanol, but insoluble in ether and benzene, whereas the higher molecular weight group compounds are soluble in ether and benzene, but insoluble in water.

My invention now having been described, what I claim is:

1. Aminoalkanediols having the formula:

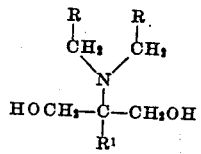

wherein R represents a member selected from the group consisting of hydrogen and alkyl, and $R^1$ represents a member selected from the group consisting of hydrogen, alkyl, and alpha-hydroxyalkyl.

2. Aminoalkanediols having the formula:

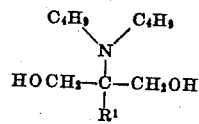

wherein $R^1$ represents a member selected from the group consisting of hydrogen, alkyl, and alpha-hydroxyalkyl.

3. Aminoalkanediols having the formula:

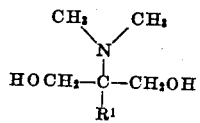

wherein $R^1$ represents a member selected from the group consisting of hydrogen, alkyl, and alpha-hydroxyalkyl.

4. 2 - dimethylamino - 2 - hydroxymethyl - 1,3-propanediol.

5. 2-dibutylamino-2-ethyl-1,3-propanediol.

6. 2-dimethylamino-2-methyl-1,3-propanediol.

7. In a process for the direct hydrogenation of 1-aza-3,7-dioxabicyclo(3.3.0)octanes to the corresponding aminoalkanediol, the step which comprises subjecting a 1-aza-3,7-dioxabicyclo-(3.3.0)octane to hydrogenation in the liquid phase, in the presence of a hydrogenation catalyst, at a temperature below 150° C.

MURRAY SENKUS.